(12) United States Patent
Bergmüller et al.

(10) Patent No.: US 12,169,751 B2
(45) Date of Patent: Dec. 17, 2024

(54) OBJECT MARKING, PRODUCTION AND AUTHENTICATION METHOD

(71) Applicant: AUTHENTIC VISION GMBH, Wals (AT)

(72) Inventors: Thomas Bergmüller, Wals (AT); Thomas Weiß, Wals (AT)

(73) Assignee: AUTHENTIC VISION GMBH, Wals (AT)

( * ) Notice: Subject to any disclaimer, the term of this patent is extended or adjusted under 35 U.S.C. 154(b) by 94 days.

(21) Appl. No.: 17/753,191

(22) PCT Filed: Aug. 28, 2020

(86) PCT No.: PCT/EP2020/074092
§ 371 (c)(1),
(2) Date: Feb. 23, 2022

(87) PCT Pub. No.: WO2021/038050
PCT Pub. Date: Mar. 4, 2021

(65) Prior Publication Data
US 2022/0194114 A1 Jun. 23, 2022

(30) Foreign Application Priority Data
Aug. 30, 2019 (EP) .................................... 19194679

(51) Int. Cl.
*G06K 19/10* (2006.01)
*G06K 7/00* (2006.01)
(Continued)

(52) U.S. Cl.
CPC ............... *G06K 19/10* (2013.01); *G06K 7/00* (2013.01); *G06K 19/06037* (2013.01); *G06V 10/145* (2022.01)

(58) Field of Classification Search
None
See application file for complete search history.

(56) References Cited

U.S. PATENT DOCUMENTS

2006/0022059 A1 2/2006 Juds
2012/0211567 A1 8/2012 Herzig
(Continued)

FOREIGN PATENT DOCUMENTS

CN 105793059 A 7/2016
CN 106500737 A 3/2017
(Continued)

OTHER PUBLICATIONS

Office Action issued in corresponding Japanese Application, 2022-514021; Mailing date: Jul. 11, 2023.
(Continued)

*Primary Examiner* — Kristy A Haupt
(74) *Attorney, Agent, or Firm* — Pearne & Gordon LLP (57) ABSTRACT

An object marking including a first security element and at least a second security element, wherein each security element is associated with a set of data segments and each security element exhibits depending on the capturing conditions, in particular the viewing angle and/or the direction of illumination, a code segment which is an optoelectronically readable representation of one of the data segments of the set associated with the respective security element, wherein different distinct data segments are represented by different code segments and that the set associated with the first security element and the set associated with the second security element differ in at least one data segment; method for producing and method for authenticating the same.

14 Claims, 5 Drawing Sheets

(51) Int. Cl.
*G06K 19/06* (2006.01)
*G06V 10/145* (2022.01)

(56) References Cited

U.S. PATENT DOCUMENTS

| | | |
|---|---|---|
| 2013/0087620 A1 | 4/2013 | Sharma et al. |
| 2015/0090777 A1 | 4/2015 | Cho et al. |
| 2015/0188706 A1 | 7/2015 | Weiss |
| 2016/0325578 A1 | 11/2016 | Ritter et al. |
| 2019/0034773 A1* | 1/2019 | Vosoogh-Grayli ........................ G06K 19/06037 |

FOREIGN PATENT DOCUMENTS

| | | |
|---|---|---|
| CN | 109690575 A | 4/2019 |
| EP | 2 849 118 A1 | 3/2015 |
| JP | 2008-084056 A | 4/2008 |
| JP | 2015-520895 A | 7/2015 |
| JP | 2015-526946 A | 9/2015 |
| RU | 2011 145 891 A | 5/2013 |
| RU | 2 641 864 C2 | 1/2018 |
| WO | 2010/100360 A1 | 9/2010 |
| WO | 2010/115872 A1 | 10/2010 |
| WO | 2013/188897 A1 | 12/2013 |
| WO | 2015/079014 A1 | 6/2015 |
| WO | 2018/046746 A1 | 3/2018 |
| WO | 2019069079 A1 | 4/2019 |

OTHER PUBLICATIONS

Extended European Search Report for corresponding European Application No. 19194679.7 dated Feb. 4, 2020.
International Search Report for corresponding International Application No. PCT/EP2020/074092 mailed Oct. 13, 2020.
Written Opinion for corresponding International Application No. PCT/EP2020/074092 dated Oct. 13, 2020.
Office Action issued in corresponding Russian Application No. 2022108193 dated Jan. 13, 2023.
Search Report issued in corresponding Russian Application No. 2022108193 dated Dec. 13, 2022.
Office Action issued in corresponding Chinese Application, 202080060139.9; Mailing date: Jun. 27, 2024.

* cited by examiner

OBJECT MARKING, PRODUCTION AND AUTHENTICATION METHOD

CROSS-REFERENCE TO RELATED APPLICATIONS

This is a National Stage application of PCT international application PCT/EP2020/074092 filed on Aug. 28, 2020, which claims the priority of European Patent Application No. 19194679.7, filed Aug. 30, 2019, which are incorporated herein by reference in their entireties.

FIELD OF THE INVENTION

The disclosure relates to an object marking comprising a first security element and at least a second security element, wherein each security element is associated with a set of data segments and each security element exhibits depending on the capturing conditions, in particular the viewing angle and/or the direction of illumination, a code segment which is an optoelectronically readable representation of one of the data segments of the set associated with the respective security element. Furthermore, the disclosure relates to a set of object markings.

Additionally, the disclosure relates to a basis material for producing object markings, comprising a first security element and at least a second security element, wherein each security element is associated with a set of data segments and each security element exhibits depending on the capturing conditions, in particular the viewing angle and/or the direction of illumination, a code segment which is an optoelectronically readable representation of one of the data segments of the set associated with the respective security element. The disclosure also relates to a method for authenticating an object marking and a method for producing an object marking.

BACKGROUND OF THE INVENTION

A number of types of object markings for authentication or verification and basis materials from which those object markings can be produced, as well as methods for authenticating or verifying those object markings have been proposed in the state of the art. For example, WO 2018/046746 A1 shows a sheet-like product comprising markers and security features. The markers are machine-readable codes. The security features are realized by security devices separate from the markers. They comprise two optical variable devices (OVDs) placed side by side, which are e.g. different diffraction gratings exhibiting e.g. different color changes perceivable from a camera or the naked eye. Thus the presence of the security feature can be easily recognized and verified with a programmable device comprising a camera through ensuring that the two OVDs appear differently. The security features all exhibit essentially the same optically variable image, however with different starting angles. The sheet-like product has multiple different markers, each with a randomly chosen security element next to it.

The optical diffraction effect, i.e. the image an optically variable device "emits" or appears to exhibit, is dependent on the illumination conditions and the viewing angle. In a typical setting, a point-like light source is assumed and the characteristic of the diffraction grating forming the security feature is designed for this specific illumination scenario. In the design process, the physical structures are developed in a way such that it diffracts the incident light in the desired way, i.e. to exhibit a certain image at a certain (azimuth) angle. More specifically, a point-like light source at a specific position is assumed and the diffraction grating is designed to exhibit specific images, e.g. specific colours or shapes, at different specific viewing angles. Therefore, the known behaviour of the security element is limited to this particular illumination scenario. Since the exhibited image of an optically diffractive security device is inherently dependent on the illumination conditions as well as the viewing angle, reading the actual content of security features becomes an inherently difficult problem in practice, when the defined environmental conditions cannot be ensured. The optically diffractive security element therefore reacts—at least to a certain extent—unpredictably under uncontrolled conditions. A typical approach to overcome this problem is to provide some sort of apparatus or other means (e.g. user-guidance, special movements, training, . . . ) to ensure conditions are at least similar to the environmental conditions used during design process. It is a subject of the present invention to overcome the limitation of a controlled environment for verification.

The sheet-like product introduced in WO 2018/046746 A1 is particularly optimized to be verified by programmable devices comprising a camera—with the markers being used to determine the desired behaviour of the surrounding security features. In a practical—uncontrolled—setting, however, it is rarely if ever the case that the defined lighting situation can be established during the verification process. Therefore, the security devices will react differently than anticipated in the design process. One therefore is forced to extract an illumination-invariant feature from an illumination-dependent optically variable security device. Not surprisingly, this is an inherently hard problem to solve and there always needs to be a trade-off between verification/authentication strictness or accuracy and robustness to account for the uncontrollable lighting conditions and influence of external, unforeseeable factors. This becomes especially difficult, if more than one point-like light-source is present in the verification setting. Also, diffuse lighting can be understood as an indefinite number of (weak) point-like light sources. In such a multiple-light-source setting inevitably different diffracted light-beams superimpose onto the programmable device comprising the camera ultimately generating multiple superimposed images visible at a single angle due to the lack of collimated incident light. There is no reliable way to filter and discriminate the superimposed reflections and therefore verifying for the right emitted image at a specific angle is a major challenge.

Traditionally, optically variable devices are designed primarily with the goal to provide optically pleasing effects. The security of such devices mainly lies within using structures that nobody else can produce, i.e. making reproduction difficult. For verification, expert knowledge is required and typically the micro- and nanostructures are evaluated in laboratory conditions to verify the correct physical structure of the gratings. Automated verifiability on a macroscopic scale, e.g. based on the exhibited images, e.g. by computer vision means, is typically not considered at all. Prominent examples for state-of-the-art optically variable devices are rainbow holograms (zero/first order diffraction gratings, typically with colourful reflections) or animations of geometrical shapes, e.g. spinning or moving objects, zooming effects (often produced with Nanostructures, micro-mirrors or the like) etc. Due to the main objective of such OVDs—namely being optically pleasing to the eye and verifiable under laboratory conditions—it is often tried to create seamless animations and continuous colour changes. In a so-thought ideal case, traditional optically variable devices are designed with an indefinite numbers of images, provided as a single area of colours shading into each other when changing the viewing angle, to provide smooth optically variable effects. Especially with rainbow holograms, this is achieved physically, as the incident white light is simply diffracted at a grating. Since they only comprise one "pixel", which exhibits a smooth colour transition, these OVDs are unable to store or encode any form of different or distinct data segments.

On the other hand, US 2012/0211567 A1 shows animated barcodes, in particular a series of successive barcodes, encoding a string of information. An optical layer is provided to affect display of different barcodes at different viewing angles such that each barcode is displayed at a different viewing angle.

The purpose of this solution is to increase the data capacity stored in the area of a single barcode. To achieve this purpose, ideal lighting conditions are implicitly assumed and indeed required. However, as mentioned above, such lighting conditions while perhaps acceptable for data storage applications, are not acceptable for security marking applications, where a reliable and convenient authentication is key to user acceptance and ultimately necessary to uncover fraud and counterfeiting.

BRIEF SUMMARY OF THE INVENTION

It is an objective of the present invention to overcome the inherent problem of unpredictable images in an uncontrolled verification environment. In particular, the present disclosure shall provide a special design of optically variable security elements of an object marking that allows more robust verification using a programmable device comprising a camera while making less compromises in verification accuracy and precision.

The invention proposes an object marking as mentioned in the outset, wherein different distinct data segments are represented by different code segments and wherein the set associated with the first security element and the set associated with the second security element differ in at least one data segment. Consequently, each security element exhibits (i.e. displays, according to its light reflection characteristics) depending on the capturing conditions at least two different code segments. The capturing conditions may include the viewing angle and/or the direction of illumination, wherein variation of either or both is necessary to reveal the different code segments. Each code segment is an optoelectronically readable representation of a data segment. The same data segment may be represented by one or more code segments. Each code segment represents exactly one data segment. The data segments represented by the code segments belong to a limited set of data segments associated with the respective security element. The first security element is associated with a first set of data segments. The second security element is associated with a second set of data segments. Each set may comprise at least two data segments. The first set of data segments is different from the second set of data segments. For example, there can be at least one data segment that is either in the first set or in the second set, but not in both sets. Consequently, the code segments exhibited by the security elements, and, ultimately, the security elements themselves are different. The object marking may comprise more than two security elements that differ in the same sense; i.e. it may comprise three or more security elements associated to a corresponding number of sets of data segments, where each pair of sets is different as per the above definition. Within this group of security elements, each security element can thus be distinguished from each other security element. Depending on how much similarity there is between regarded sets (e.g. the number or ratio of data segments in more than one set), it is possible to distinguish any two security elements within such a group by reading one or more of their code segments under a corresponding number of capturing conditions. There can be a predefined maximum number of code segments exhibited by each security element, such that at least when this number of code segments is read from any two security elements, it is possible to distinguish them.

Without limiting the scope of the present disclosure, the object marking may in addition comprise similar security elements, i.e. two or more security elements that are associated with the same set of data segments. In case of more than one group of similar security elements, those groups may differ in their size (i.e. their number of security elements) and/or the relative arrangement between their members (e.g. the distance between security elements from the same group or the direction of the nearest neighbour from the same group). These properties and measures provide that distinct, but similar security elements can be distinguished by their respective neighbouring (or contiguous), dissimilar security elements. In other words, even similar security elements can—more often than not—be distinguished from one another, if it is possible to read a neighbouring (or contiguous) dissimilar security element. In essence, what happens is that two or more sets of data segments are combined based on the geometric distance of their associated security elements. Then, a first combined set and a second combined set differ in at least one data segment. For easier understanding in that case we refer to different "neighbourhoods" of security elements.

Distinguishing different security elements or different neighbourhoods can be used to increase the diversity of object markings that can be produced from a given basis material. Increased diversity means that the probability of any two authentic object markings are identical or even similar is decreased. The effort to forge an object marking is proportional to the number of different instances that must be forged, because replicating the same instance generally requires relatively less effort. In a preferable setting, this can be achieved by observing the relative frequency of verified object markings with the same, undistinguishable pattern—so essentially physical authentic replicas. This observation may either be made by capturing all verifications from a single verification device comprising a camera or from a data-base, where verification data of multiple programmable devices comprising a camera is captured. Due to the low probability of authentic replica, there can be a low threshold on the frequency of replica and thus forgery can be detected easily if it is used to produce an above-average number of replica. Hence, greater diversity makes forgery without the risk of trivial detection more costly and ultimately less attractive.

The invention further proposes a set of object markings, wherein the set comprises a number of object markings as defined above. For example the set comprises two or more object markings of the above-defined type. A set of object markings, especially when it comprises more than 100, more than 1000 or more than 10000 object markings, exhibits the statistical properties of a single object marking. Specifically, for example the average repetition rate of security elements with any particular set of data segments or the repetition rate of any particular neighbourhood or combined set of data segments can be determined from a set of object markings or otherwise the set size determines an upper boundary for such a repetition frequency. In other words, the statistical properties of the set are quantitative and measurable expressions of the diversity described above.

Furthermore, the invention proposes a basis material as mentioned in the outset, wherein different distinct data segments are represented by different code segments and that the set associated with the first security element and the set associated with the second security element differ in at least one data segment. The basis material is provided for producing object markings. Optionally, the basis material comprises a sufficient number of security elements to produce at least two object markings, or at least three object markings or more. For example, the basis material may comprise a two-dimensional array of security elements with significantly more than two security elements, e.g. an array of at least 5×5 security elements or at least 10×10 element or at least 20×20 security elements. Without limiting the scope of the present disclosure, the basis material—like explained for a single object marking above—may in addition comprise similar security elements, i.e. two or more security elements that are associated with the same set of data segments. Everything that has been explained for a single object marking above regarding distinguishable "neighbourhoods" applies as an analogous possibility to the basis material. Moreover, and again without limiting the scope of the present disclosure, the basis material may have repeating sequences of security elements, wherein a period of repetition, i.e. the distance between repeated instances of security elements, is significantly larger than the dimensions of a single object marking, e.g. at least ten times larger or at least hundred times larger.

Furthermore, without limiting the scope of the disclosure, the invention proposes a method to produce object markings by randomly or pseudo-randomly combining at least two different security elements. The random combination may be achieved by changing the "neighbourhood"-configurations of distinguishable security devices, i.e. arranging them differently for different object markings. To produce security devices comprising at least two different security elements by the present method, an apparatus configured to randomly or pseudo-randomly select from a limited set of distinguishable security elements and placing them in a randomly or pseudo-randomly way in specific geometrical arrangements may be used. More specifically, the security elements may be pre-produced with any means suitable to produce optically variable devices. Further, any registered transfer process suitable to transfer the pre-produced security elements to a carrier material (forming the object marking) or the object itself may be used. For example, registered hot- or coldstamping, digital cold foiling etc. may be used to transfer at least two OVD-like security elements to a carrier material or object to produce a security device and object marking according to the present invention.

The invention also proposes a corresponding method for authenticating an object marking, the object marking comprising an optoelectronically discernibly delimited area of a basis material (e.g. forming an object marking, optionally on a carrier material or directly on an object), wherein the basis material is a basis material as disclosed above, wherein the area comprises the first security element and at least the second security element, the method comprising the steps:
    capturing a first image of the object marking from a first angle or under a first direction of illumination;
    identifying a first code segment exhibited by a first security element in the first image;
    decoding the first code segment to obtain a first data segment;
    capturing a second image of the object marking from a second angle and/or under a second direction of illumination;
    identifying a second code segment exhibited by the first security element in the second image;
    decoding the second code segment to obtain a second data segment;
    determining from a model storing the sets of data segments associated with the security elements of the basis material whether there is a set of data segments containing the first data segment and the second data segment.

The above method essentially checks whether a combination of data segments contained in the first security elements has a corresponding set of data segments according to a stored model comprising the definitions of all valid sets of data segments. If no match, i.e. no corresponding set, is found, the security element likely belongs to a forged object marking.

For authentication purposes of a particular security element it may be sufficient to only observe a subset of at least two code segments of all possible code-segments for that particular security element. In a preferable setting, the authentication method may be set up to confirm authenticity when N code segments out of M possible code segments (known from the model) for that particular security element are observed from different angles or under different capturing conditions (e.g. lighting). Examples for the parameters N and M are: N=2 (N must be greater or equal 2), M=5 (M must be greater or equal N, e.g. M=N+1, M=N+2, M=N+3, M=N+4). As all code segments are independent, it does not matter, which N=2 of the M=5 are decoded. Any combination is sufficient.

Generally, it may be sufficient for observing two or more different code segments of a particular security element to change the viewing angle, while the direction of illumination (e.g. the arrangement of the light source and the security element) remains unchanged.

Finally, the invention proposes a method for producing an object marking, comprising the steps:
    randomly, pseudo-randomly or deterministically selecting an area of a basis material, wherein the basis material is a basis material as disclosed herein, the selected area comprising the first security element and at least the second security element, and
    optoelectronically discernibly delimiting the selected area from the not-selected part of the basis material.

The method for selecting the area of the basis material can contribute to the diversity of the resulting object markings. Random and also pseudo-random selection ensure that no inadvertent repetitions with a legitimate relatively high repetition rate are created. These measures therefore further increase the diversity. The selection's shape, dimensions or any other optoelectronically readable properties may be varied. Selection may either be done by cutting or stamping from a basis material, combining multiple security elements directly on the object or partially over-printing the basis material and using a negative selection mask, so that the basis material is only visible in this masked area.

In another preferable setting, since through the model the selection position from within the basis material is known, the suggested basis material is especially suitable to be used to produce security devices as suggested in WO 2015/079014 A1 and/or be used in security systems as e.g. introduced in WO 2013/188897 A1. In such a particular setting, the randomness introduced through the selection process, e.g. due to manufacturing tolerances, is combined with the a-priori known geometrical information from the model, which is essentially mapping the basis material.

By providing for the security elements to exhibit code segments optoelectronically representing data segments instead of for example security elements with a rainbow effect, i.e. smooth color change, the authentication of the object marking is much more robust. The reason for this is that it can be determined whether the code segments actually represent valid data segments. The chance that random or diffuse illumination conditions will lead to an invalid security element accidentally exhibiting a code segment representing a valid data segment is much lower than that an invalid colour-shifting image or a simple geometric shape will accidentally display a valid image. Furthermore, by the security elements exhibiting code segments representing data segments, from scanning a code segment the position of that code segment in an original basis material (or one of a small number of valid positions) can be determined and its validity verified via a model associating sets of data segments (or neighbourhoods) with positions. In other words, the security elements are used as landmarks within a model (which e.g. maps a basis material, from which the object markings are produced). Since the security elements differ in at least one data segment, the position can be determined by varying the capturing conditions. Alternatively or additionally, depending on the sets, the position can also be determined by capturing the first security element and the second security element under only a single capturing condition and looking for corresponding combinations of neighbouring sets (of neighbouring or contiguous security elements). In that case the "neighbourhood" may serve as landmark within the model. It is noteworthy that for verification in this setting for at least one security element at least a second code segment (and corresponding data segment) needs to be observed from at least a second different capturing environment in order to ensure that indeed an OVD is present (and not e.g. a printed replica representing the OVD from in a single capturing environment). It is further noteworthy that the object marking as disclosed herein, specifically the security elements, does not allow the use of an animated barcode to encode more information than a conventional barcode. Instead, it allows to use animated barcodes for authentication.

Under exhibiting depending on the capturing conditions a code segment is understood that the respective code segment is physically displayed in at least some form. In particular, there is at least one capturing condition for each code segment, under which that code segment can be distinguished from other code segments of that security element and/or can be optoelectronically identified out of the code segments representing the data segments of a set of that security element.

With viewing angle is meant the viewing angle of the object marking, more particularly of the respective security element. For practical applications, it is important to mention that—strictly speaking—the viewing angles and capturing conditions are already slightly different for neighbouring security elements. This is a difficult problem to solve with traditional optically variable devices. One may either design the optically variable devices with characteristics so robust that the geometrical offset is neglectable. Alternatively, and in our experience impracticably, the capturing conditions may be estimated from the observed exhibited image from the first code segment and a mathematical model employed to conclude on the expected exhibited image of the at second, neighbouring, code segment.

One advantage achievable with the present disclosure is, that the authentication is essentially checking whether a particular data segment belongs to a particular security element's set of data segments. This verification method is very robust and does no longer require to account for the diversity of capturing conditions occurring within a single captured image due to geometrical distortions across the security device or more specifically, across the object marking.

A code segment of the second security element is preferably at least partially, more preferably completely, non-overlapping with a code segment of the first security element. The code segments representing data segments from the set associated with the first security element are preferably at least partially, more preferably completely, non-overlapping with the code segments representing data segments from the set associated with the second security element. Also the security elements themselves, i.e. the first security element and the second security element, may be at least partially non-overlapping or (completely) non-overlapping. I.e. they may be arranged without an overlap between the first security element and the second security element. They may be arranged for example adjacent, contiguous or at a distance from each other.

Optionally, the set of data segments associated with each security element is the aggregate of the data segments optoelectronically readably represented by the aggregate of code segments exhibited under the totality of capturing conditions. Optionally, for each data segment in the set of data segments associated with each security element there is at least one code segment optoelectronically readably representing said data segment under at least one defined capturing condition. I.e., each code segment optoelectronically readably representing a data segment in the set of data segments associated with each security element is exhibited by said security element under at least one defined capturing condition.

According to a particular embodiment of the present object marking, for a fixed direction of illumination, each data segment in a set associated with a security element (and, hence, each code segment exhibited by the respective security element) is associated with a distinct viewing angle region, within which the contrast of the code segment representing the respective data segment is higher than the contrast of the code segments representing all other data segments from the same set. In other words, the code segments are associated with viewing angle ranges or regions under which they can be read out. Conversely, each viewing angle is attributable to only one specific code segment (and, hence, data segment), but each code segment can be visible from multiple different viewing angles. The viewing angle ranges in general depend on the actual illumination and may indeed overlap in case of multiple distributed light sources. It is also noteworthy that in a practical application a particular data segment may be associated with multiple distinct viewing angles or viewing angle regions, wherein each viewing angle or viewing angle region may be exclusively attributable to exactly one data segment, i.e. there may be a mutually exclusive distribution of viewing angles or viewing angle regions among the data segments of a particular set associated with a security element.

In this context there may optionally be at least one viewing angle region associated with a data segment of the set of the first security element, which differs from each of the viewing angle regions associated with the data segments of the set of the second security element. Consequently, there may be at least one viewing angle at which the first security element changes the exhibited code segment while the second security element does not change the exhibited code segment. In more general words, the switching characteristics may be different between the first security elements and the second security elements. For example, switching characteristics may be different due to different sizes of the first set of data segments and the second set of data segments: e.g. the first set of data segments may consist of nine data segments and the second set of data segments may consist of 18 data segments, wherein the first security element exhibits a different code segment (i.e. switches) every 20° between 0° and 180° viewing angle and the second security element exhibits a different code segment (i.e. switches) every 10° between 0° and 180° viewing angle.

Each code segment may be a structured image, in particular a barcode-like structure, preferably a 2D-code, more preferably a 2D-array-code. These types of images are relatively easy to read out optoelectronically. Especially, structured images can provide sufficient contrast to discern the structure at different illumination conditions.

More specifically, each code segment may be a 2D-array-code, wherein each code segment is an array of tiles and the data segment is represented by the code segment by each of the tiles of the code segment taking one out of at least two optically distinguishable states (e.g. dark or light, black or white), wherein the code segments exhibited by the first security element are arranged contiguous to the code segments exhibited by the second security element. The 2D-array-code may do without delimitations between tiles of contiguous code segments and/or without finding patterns.

According to an embodiment of the present disclosure, every code segment may represent the respective data segment in a pre-defined encoding, wherein the pre-defined encoding preferably comprises information for error detection or error correction.

Optionally, the pre-defined encoding may allow for a maximum number of possible distinct data segments and the number of data segments in the set of data segments of each security element may be less than $1/100$, preferably less than $1/1000$, more preferably less than $1/10000$, of the maximum number of possible distinct data segments. In other words, only a fraction of possible data segments (and—consequently—code segments) may be actually used. Assuming that reading errors will concern all parts of code segments approximately equally, this can be used to detect reading errors, because they will more likely than not result in a read-out data segment that is not in use. In this respect, the used data segments can be chosen such that for example the code segments representing them differ in more than one tile (in case of tiled 2D-array-codes), preferably more than two tiles, such that a single flipped tile will result in an unused data segment and consequently a detectable read error.

The positions of the security elements relative to one another may be pre-determined. Those positions may for example be stored in a model and used to identify and distinguish neighbourhoods of otherwise (at least partly) similar security devices, thus improving on diversity of distinguishable object markings.

Accordingly, with respect to the basis material, the positions of the security elements on the basis material may be predetermined relative to one another according to a model and the data segments of the sets associated with the security elements may be predetermined according to the model.

Accordingly, when object markings are produced by randomly, pseudo-randomly or deterministically placing security elements in a geometric arrangement, the positions of said security elements may be recorded in a model or data base. This information may be accessed during verification.

Optionally, every code segment may represent the respective data segment in a pre-defined encoding, wherein the pre-defined encoding preferably comprises information for error detection or error correction. Error detection is particularly useful to trigger re-reads (i.e. a repeated reading attempt) of the code segment concerned, where such re-reads advantageously will generally be performed under different illumination conditions, increasing the chances that the same reading error will not be repeated. Error correction provides for more robust optoelectronic readout of code segments, where often read errors of small parts of the code segments can be tolerated. Both, error detection and error correction, thus contribute to the robustness of the readout. This decreases the likelihood that an authentic object marking will be rejected (false reject). It is worth mentioning, that especially using well-known error-correction encodings, e.g. Reed-Solomon, is known to be vulnerable for false-decodes when used on a very small data-segment, e.g. 16 bit, but high error-correction capacities.

As an extension to what was discussed above for single object markings, the pre-defined encoding may allow for a maximum number of possible distinct data segments and the number of distinct data segments in the sets of data segments of all security elements (i.e. on the basis material) may be less than $1/100$, preferably less than $1/1000$, more preferably less than $1/10000$, of the maximum number of possible distinct data segments. This sparse use of data segments may be exploited to further minimize the number of false rejects for the known vulnerability with very small data-segments in error-correction codes, as mentioned above.

With regard to the method for authenticating an object marking, the method may further comprise the steps:
 identifying a third code segment exhibited by a second security element in the first image or in the second image;
 decoding the third code segment to obtain a third data segment;
 determining from a model storing the sets of data segments associated with the security elements of the basis material and storing the relative positions of the security elements of the basis material to one another whether the second security element positioned relative to the first security element is associated with a set of data segments containing the third data segment. In this instance, the optical variable nature of the second security element is verified and—additionally—the contained information is used to increase diversity of object markings.

According to a specific embodiment of the present method for authenticating, the security elements of the basis material, of which the object marking comprises a section, may be arranged in a tiled manner and each code segment exhibited by the security elements is an array of tiles and the code segments exhibited by one security element are arranged contiguous to the code segments exhibited by other security elements such that a larger array of tiles is formed, wherein the method further comprises the steps:
 a) identifying a first sample tile in the first image;
 b) decoding a first sample code segment in the first image formed by a first sample array of tiles including said first sample tile on a pre-defined position, to obtain a first sample data segment;
 c) determining from a model storing the sets of data segments associated with the security elements of the basis material whether there is at least one set of data segments containing said first sample data segment;

d) if no such set can be determined in step c), repeating steps a) to c) with different first sample tiles until such a set is found in step c); and l) identifying the current first sample code segment as the first code segment.

Optionally, more specifically the method may further comprise the following steps prior to step l):

e) identifying the first sample tile in the second image;

f) decoding a second sample code segment in the second image formed by the first sample array of tiles, to obtain a second sample data segment;

g) determining from a model storing the sets of data segments associated with the security elements of the basis material, whether at least one of the at least one sets containing the first sample data segment contains the second sample data segment;

h) if no such set can be determined in step g), repeating steps a) to g) until such a set is found in step g); and m) identifying the current second sample code segment as the second code segment.

Finally, to optionally further refine the method for authenticating, the method may further comprise the following steps prior to step l) and—if applicable—prior to step m):

i) decoding a third sample code segment formed by a second sample array of tiles positioned relative to the first sample array of tiles, to obtain a third sample data segment;

j) determining from a model storing the sets of data segments associated with the security elements of the basis material and storing the relative positions of the security elements of the basis material to one another, whether the third sample data segment is comprised in the set of data segments which belongs to the security element respectively positioned relative to the security element the set preliminary identified under step e) belongs to;

k) if no such set can be determined in step j), repeating steps a) to d) and steps i) to j) and preferably steps e) to h), until such a set is found in step j);

n) identifying the current third sample code segment as the third code segment.

BRIEF DESCRIPTION OF THE DRAWINGS

Referring now to the drawings, wherein the figures are for purposes of illustrating the present disclosure and not for purposes of limiting the same, FIG. 1a schematically shows a first embodiment of a basis material for producing object markings according to the present disclosure with six complete security elements and below the object marking visually indicates two sets of data segments associated with two of the security elements.

DESCRIPTION OF EXAMPLE EMBODIMENTS

As a basic building block of the basis material 1 and consequently the object marking 8 according to the present disclosure, security elements 2 optimized for being verifiable with a programmable device comprising a camera are proposed in the first embodiment. The security elements 2 of the basis material 1 can each only display a very limited, discrete set of distinguishable images. This implies—due to the indefinite number of possible combinations of illumination setting and viewing angle—that each image of this limited set will be visible from multiple viewing angles. Practically, such security devices 2 may be designed by creating optical elements, which exhibit a certain picture for a range of (azimuth) angles, i.e. show the same picture for +/−5 degrees. This can be realized with lenticular lenses, diffraction gratings, micro-mirrors and micro-lenses, nano-structures etc.

The security elements' exhibited images can be images in the "traditional" sense, e.g. geometric shapes, combination of shapes, different colours, pixelarized images etc. In the present disclosure those images are also referred to as code segments. Subsequently, we will illustrate different possible structures of a basis material (usually, a sheet-like product) and different embodiments of the present disclosure.

Figure 1A:
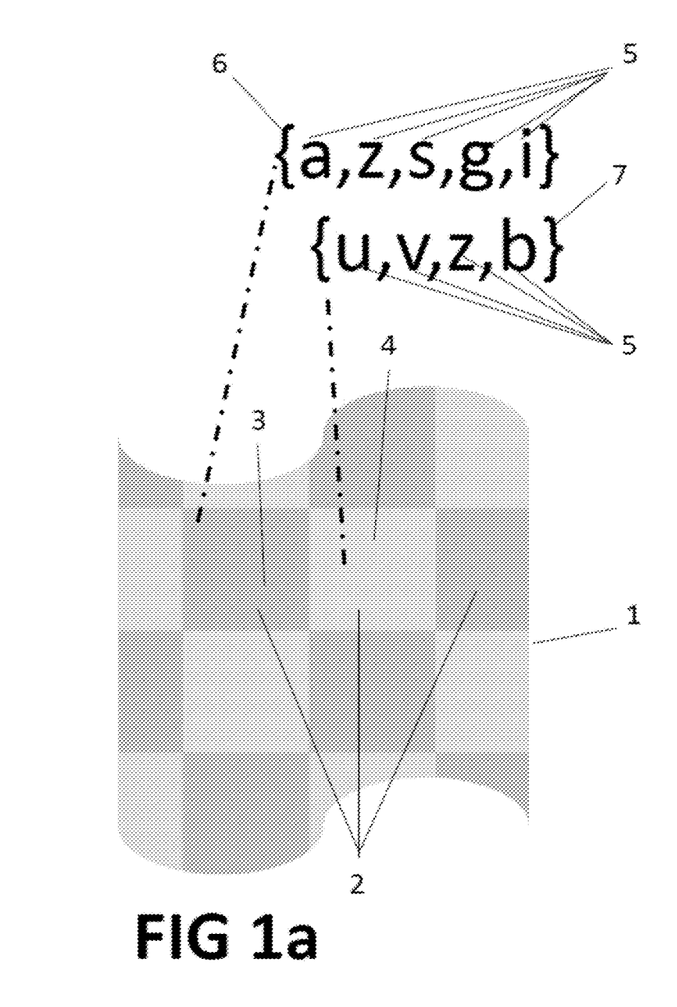

To outline the principal functionality of the present disclosure, we assume in FIG. 1a for illustrational purposes a setting, where the set of available images consists of images of lower characters from the Latin alphabet, i.e. {a . . . z}. FIG. 1a further exemplarily exhibits a part of the proposed basis material 1 comprising multiple security elements 2. For easier comprehension, we focus the explanation on a first security element 3 and a second security element 4. The first security element 3 is configured to exhibit—depending on the angle of view—one image (or, generally, code segment) 5 out of a first set of images 6 (or generally, code segments representing data segments from a first set of data segments). The second security element 4 is configured to exhibit—depending on the angle of view—one image (or generally code segment) 5 out of a second set of images 7 (or generally, code segments representing data segments from a second set of data segments). The number of images in the two sets 6, 7 may be different as well as the angular coherence, i.e. the images in the first set 6 may have different switching characteristics than the images in set 7. Also, certain images may appear in multiple sets, e.g. in 6 and 7, provided the sets themselves are distinguishable, i.e. not all elements are equal.

As outlined earlier, various production processes are possible to produce a selection or object marking 9 from the base material 1.

Figure 1B:
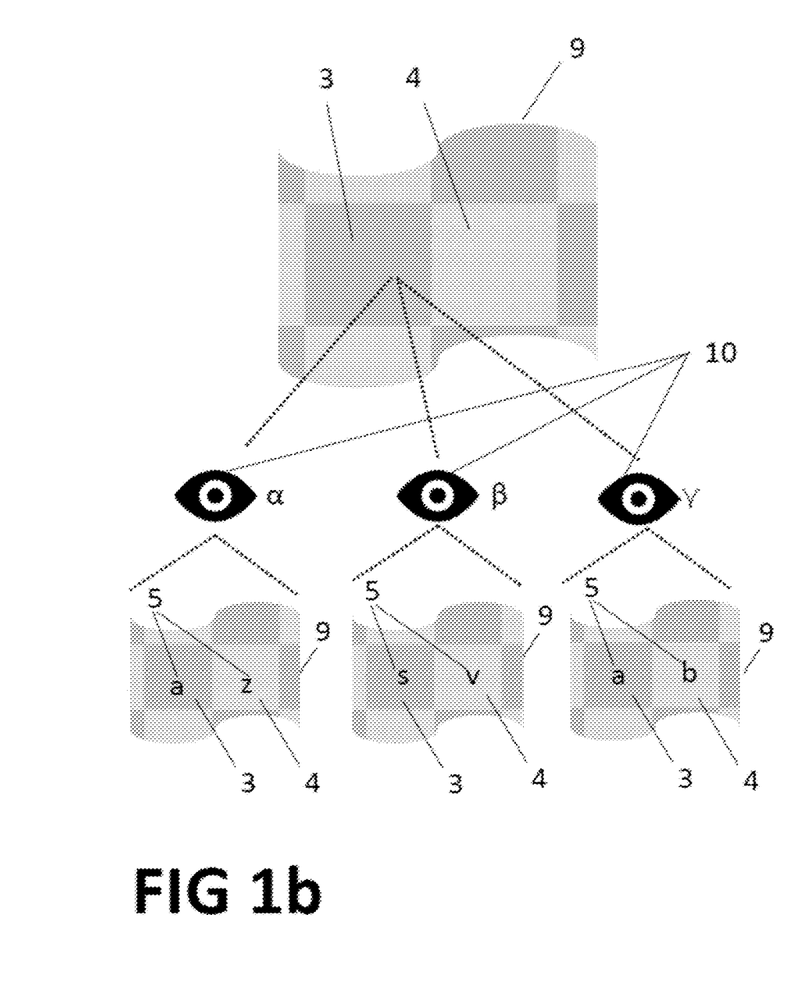
FIG. 1b schematically shows an object marking and indicates the exhibited code segments at three different viewing angles.

FIG. 1b exemplarily shows, after a selection from the basis material 1, an object marking 9, which contains the first security element 3 and the second security element 5. FIG. 1b further illustrates the exhibited images (or code segments) 5 of said selection when viewed from different angles 10. When viewed from the first angle 10 α, the first security element 3 displays the image (or code) "a", which is member of the set of images 6 corresponding to the first security element 3. At the same angle of view, the second security element 4 displays the image (or code) "z", which is member of the set of images 7 corresponding to the second security element 4.

Similar, at the angle 10 β, the first security element 3 exhibits "s", while the second security element 4 exhibits "v", both members of the corresponding sets of images 6, 7. We want to note that—due to the very limited set of available images and the indefinite number of possible illumination/perspective scenarios, different or all combinations of the images may become possible. For example, under observing angle 10 γ, the first security element 3 again shows the image "a" 5 (similar as in angle 10 α), yet the second security element 4 displays the image "b" 5. This scenario may further occur if in the design of the basis material 1 different switching characteristics, i.e. different optical elements and characteristics, are employed for the different security elements 2. The first security element 3 may—besides having a different set of images—also have different switching characteristics/switching angles than the second security element 4.

As a note on notation, for clarity in subsequent figures we will use capital letters A . . . P to denote the different security elements 2. We will denote a first security element 3 with the letter "A" and a second security element 4 with the letter "B" etc. The first image (or code segment) 5 in the set of images 6 will subsequently be denoted as A_1, the second as A_2 etc. Similar, images (or code segments) 5 for the second security element 4 out of the corresponding second set of images 7 will be denoted as B_1, the second as B_2 etc. In the simplest case, each code segment has a 1:1 relationship with a corresponding data segment. However, the scope of the present disclosure extends to situations where multiple code segments (e.g. A_1.1, A_1.2, etc.) may represent the same data segment (e.g. A_1). Relevant for the set is the data segment. For simplicity, we will use, in connection with the description of the subsequent figures, the terms images, code segments and data segments synonymously and labelled as 5.

In practical applications, when using computer vision means on programmable devices comprising a camera to verify or read certain images, the reading/decoding correctness of images itself is always a concern. Although the introductory mentioned example of color-shifting images sounds rather simple, reading and classifying (absolute and even relative) colours is still a very hard problem in the field of computer vision. Therefore, choosing different colours as the different exhibited images is not recommended. Geometric shapes or in general, structured images with good contrast are more reliable to read and decode, but still—without taking any additional measures—it is next to impossible to avoid decoding errors completely. So in a practical application, using generic images or even images of letters (as used in FIG. 1) poses a non-trivial problem, when practically error-less reading is required. And this is indeed desired for the present purpose, as we need a reliable way to determine from a decoded image whether it's data segment representation is a member of the set of data segments for that particular security element or not. And we certainly do not want to impede adoption by consumers by rejecting authentic object markings due to reading errors.

In a preferable embodiment, the images 5 are designed in a way, so that they are easily and practically error-free readable in an automated way by the programmable device comprising a camera. One possible measure to ensure correct readability, is to embed checksum-like/parity-like structures in the each of the possible images. This concept is well known in the field of telecommunication; The image is structured into at least two separately readable/decodeable parts, and there is a relation between those parts. In the information technology space these parts are often referred to as "codewords" respectively "payload" and "parity". The codewords/parts a separately read and decoded, and the decoded results are then matched against each other. If they match, correct reading is confirmed. Prominent methods embodied in the field of information technology are checksums, Cyclic Redundancy Check Codes (CRC) or Error-Correction (EC) codes. In the domain of visually decodeable barcodes, especially the Reed-Solomon Encoding—an example for EC codes—is popular.

We therefore propose as one possible embodiment of the present disclosure, to use images 5, which are optimized for robust readability/decodability using programmable devices comprising a camera. An intuitive choice is to use barcode-like structures, e.g. 2D-Codes or a pixel-wise structure, representing Code-Words encoded with EC-Codes, e.g. Reed-Solomon encoding.

Such encodings offer the possibility, to encode any kind of digital data segments (e.g. numbers, alpha-numerical numbers, binary data etc.). In a preferable setting, numerical or alphanumerical identifiers may be encoded in a 2D-like structure and the set of possible images corresponds to the set of encoded identifiers.

While one could use standard Barcode structures, such as Data-Matrix-Codes, QR-Codes etc., we propose to use a customized structure and arrangement of code-words using error-corrective coding, e.g. Reed-Solomon coding. This is more efficient in terms of space and data capacity, i.e. increases the number of possible images. This is due to the fact that these standard barcode structures use special structures or patterns to encode version information, Finder-patterns to localize and determine the size of the codes in images etc. We propose a way to localize and decode such structures without the commonly used finder-patterns etc. later in this document.

The use of optical diffraction layers to display—depending on the viewing angle—different, spatially overlapping—linked barcode-structures is already known from e.g. US 2012/0211567 A1. The US 2012/0211567 A1 suggests to use an optical layer, which functions in a way that when being viewed from different angles, different barcodes are shown. They further propose to use an encoding to link those at least two viewing-angle dependent codes together and determining their order. The main objective of this invention seems to be an increase in data storage capacity, hence the effort to establish links in order to re-assemble the data to one data segment when reading the different codes.

We want to empathize that in the present invention the viewing-angle dependent images/code segments/data segments are independent of each other. Further, the present invention is—opposed to data-storage applications—designed that only a fraction of the data-segments from a particular set of data segments needs to be decoded. The order of decoding is irrelevant, since only the membership of a decoded data segment to a particular set of data segments identifying a particular security element is important. Finally, it is a subject of the present invention to identify a security element's position within a basis material, by determining the particular security element's identity through decoding at least one data segment from at least one viewing angle and determining the position within the basis material—preferably under consideration of decoding other code-segments under different capturing conditions and determining their corresponding set-membership—by using a-priori knowledge from a model, storing the sets of data segments identifying the security elements as well as their geometrical relation to each other. Therefore—in strong contrast to e.g. the US 2012/0211567 A1—the relation between different data segments/code-segments is determined via a pre-determined model instead of (physically) encoding link- and order-information within the data segments/code-segments themselves.

Figure 2:
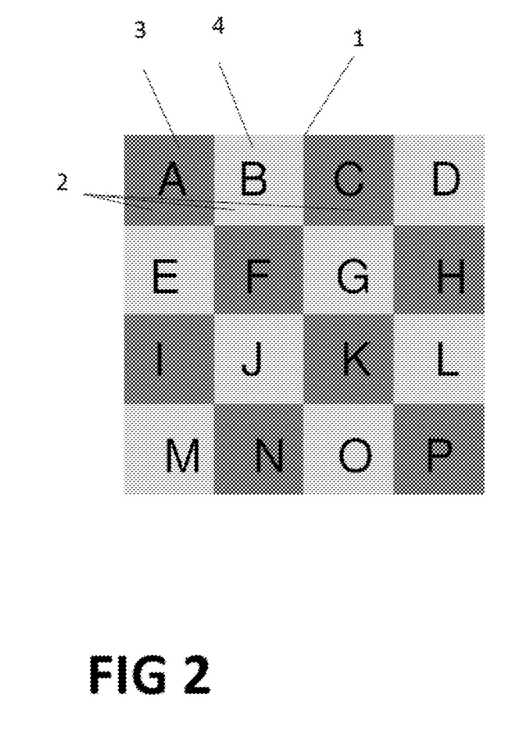
FIG. 2 schematically shows a second embodiment of a basis material according to the present disclosure for producing object markings, with sixteen security devices exhibiting 2D-array-codes as code segments, where the code segments at different viewing angles are indicated.

FIG. 2 illustrates a preferred embodiment of the present disclosure. The range of possible pictures is limited by 6×6 pixels, which can either be black or white. The basis material 1 comprises multiple security elements 2, which are arranged in a tiled manner. For example, a first security element 3, identified as security element A, is placed contiguous (or directly adjacent) to a second security element 4, identified as security element B. Each of the security elements 2 embodies an optically variable element, which displays one out of N different images when viewed from different angles or illumination conditions. So a first security element 3, identified as security element A, can switch between N different images A_1, A_2, ... A_N (5) in the set of possible images 6 for this particular security element under different capturing conditions $\alpha, \beta, \ldots \omega$. A similar second set of images 7 with available images B_1, B_2, ... B_N is defined for a second security element 4.

It is important to mention that in a practical setting a trade-off between switching sensitivity, i.e. the "speed" of the switching effect and robustness needs to be made. Especially, if diffuse lighting or multiple point-like light sources with similar intensity are present, cross-talk between multiple images may occur, i.e. two or more of the N images in the set of M possible images may superimpose with different intensities. In this case, the error-correction functionality becomes especially useful, since it allows to filter between the superimposed images to some extent or at least determine that under present conditions the image cannot be read reliably.

In a practical setting during read-out there is often more than one illumination (light) source present. For example, there may be a dedicated light source linked to a verification device comprising a camera. When operating in realistic conditions, there is always a certain residual of ambient light or there may be even point-like light sources (lamps, sun, ... ) superimposing with the dedicated light source. In another practical setting, there may not be a dedicated light source but a super-position of multiple "natural" light sources. Further, it may be beneficial to equip the verification device comprising a camera with multiple dedicated light sources, which may either be switched on and off one at a time or in a preferable setting are switched on at the same time creating a mixture of different more or less directional light sources.

The cross-talk between multiple images caused by multiple light-sources or diffuse light may be leveraged during readout. Based on the information known from the model and utilizing the error-correction functionality, it is possible to decompose the superimposed images and decode multiple code-segments. This allows under certain circumstances that the security element can be verified from a single captured image, if the superimposed image can be decomposed successfully into at least two different code-segments belonging to the set of available code segments for a particular security element. A very simple method to achieve such a decomposition is the following:

From the superimposed image, determine the intensity of the dominating code-segment in the superimposed image (e.g. via grayscale values and histogram analysis)

Filter all other intensities to isolate the prominent code-segment

Decode the isolated prominent code-segment

Determine the corresponding security element and therefore the set of available code-segments for the particular security element.

Proceed with other possible intensities likewise and try to decode.

If there is a second code-segment, which can be decoded and matches the set of available code-segments for the particular security element, the security element can be considered valid and authentic.

In another preferable setting, one may not try to find the intensity of the dominating code segment but simply iterate over all possible intensities. For each intensity, isolate a "possible" code-segment. If it is decodeable, i.e. error-correction and error-detection are successful, assume this is a valid code-segment and determine the corresponding security element. Then iterate over the remaining possible intensities, filter for each intensity and try to decode the possible code-segments at those intensities. If there exists at least a second intensity, where a code-segment can be decoded and the code-segment is a member of the set of available code-segment of the corresponding security elements, the security element can be considered as authentic.

In each of those cases, the authenticity of a security element (and hence at least a part of the security device) can be verified from a single captured image under the precondition, that the illumination environment comprises a suitable superposition of light-sources suitable to isolate and filter different code-segments.

In the present example of 6×6 pixels, the number of distinguishable pictures is theoretically $2^{36}$. In a naive setting, this would mean that we could encode $2^{36}$ different identifiers. However, in this case there is no room for error correction and correct decoding cannot be ensured. If an error-corrective coding is used, we may e.g. use 12 bits for the error correction and 24 as payload—so the number of distinguishable images may be reduced to $2^{24}$.

If we chose a small number, e.g. N=5 images, for each set of images 6, 7 for a first security element 3 and second security element 4, this allows already to "encode" a fairly large area of a sheet-like product by simply placing security elements in a tiled manner on the sheet-like product. However, practical applications call for an even more robust error-correction capability, especially when smartphones or tablet computers with a bad capturing quality are used as the verifying programmable device comprising a camera. In such a tolerant and high-redundancy setting (e.g. 16 bit payload, 20 bit error correction), a fairly large amount of "destroyed" data (e.g. due to bad capturing quality, wrong binarization and classification etc.) can be corrected. This comes at the cost that false reads, i.e. decoding the wrong identifier, become a lot more likely or even probable.

In the verification setting, one can then benefit from making the model of the sheet-like product, i.e. the sets of possible images for each security element, available to the verifying programmable device comprising the camera. The model is known a priori, as it poses as the blue-print for designing the sheet-like product. While one false-read may happen in a high-redundancy setting as described above— admittedly already with reasonably low probability—it is highly unlikely, that a second decoding results in a false-read again and especially that those two false reads correspond to two images member of the same set of N=5 images (out of e.g. $2^{16}$ available images). So false-reads can further be reduced or practically eliminated by using two images from different angles of the same security element and checking, whether both identifiers are part of the set of images defining this particular security element.

Alternatively—or additionally—one could use the spatial relation of different security elements relative to each other. So if for instance in a first security element (with the modelled set of available images A_1 ... A_N (6)) a wrong image, e.g. P_2, is decoded, and in the neighbouring second security element (with set 7: B_1 ... B_N)—correctly—B_2 is decoded, it is evident from the model that one of the two must be a false-decode. If the first region 3 decodes to an image 5 out of the set 6: A_1 . . . A_N and the second region 4 decodes to an image 5 of the set 7: B_1 . . . B_N, this can safely be assumed to be two correct reads. We want to empathize that this geometrical relation embedded in the model may be especially useful to minimize the chance of false-decodes when images without error detection/error correction capabilities are used.

Typically, e.g. for the standard 2D-Code Formats such small codes as 6×6 elements do not exist—simply because the risk of false-decodes with such short payloads is typically too high to be suitable for practical applications. Nonetheless and similar as outlined above, the present disclosure allows to use such small codes in a practically error-free reading setting, by exploiting the angular and/or spatial relation of images. This becomes possible by increasing the decoding correctness by using the a-priori knowledge available from the pre-determined model of the sheet-like product in the programmable device comprising a camera. A benefit of using such small codes over more suitable code-sizes (e.g. 10×10 and higher) is that the security devices, which need to contain at least one security element, can become smaller and still be decoded practically error-free.

In such a setting, namely using the decodes of at least two security element and employing the model of the basis material to confirm the correct decoding, it is practically impossible that a false-decode occurs.

Having a practically error-free way of decoding the images or rather determining the appropriate set of possible images enables two beneficial settings:

The security elements characterized by their set of possible images can act as identifiers (uniquely or almost uniquely) attributable to an absolute position within the basis material. It is important to note that not all N images need to be decoded to determine a set of possible images and identify the corresponding security element. It is for example sufficient, if two images from different angles are decoded and a set containing those two images can be determined from the available model of the sheet-like product. Given the fact that the sets are structured in a way such that no set can contain the same pair of images than any other set/so that a pair of images is unique over all sets in the basis material in this assumed embodiment.

The encoding in the security elements does not need 2D-Code typical structures such as finder-patterns, frequency patterns or any other segmentation/localization measures. The security-elements can be placed next to each other in a tiled manner without any indicator on where one security element ends and the next begins. The high specificity (low chance of a false-read) allows to slide a window pixel by pixel over the currently exhibited image. Each possible position is decoded. If it can be decoded (i.e. an identifier is extracted), all possible sets containing this particular image/identifier are pre-determined from the model. In a second step, either a spatially or angularly different image is decoded. In the case of an angularly different image (i.e. from a second captured image), all pre-determined sets are searched for the second decoded identifier. All sets which do not contain this second image this identifier, are no longer candidates. By iteratively doing this, only one set will remain—which identifies the security element and at the same time allows to define the boundary of that security element for subsequent readings in other captured images. In the case of using a spatially different image, the same captured image may be used. Assuming 6×6 codes: For each candidate position, where an identifier could be decoded, the programmable device comprising a camera is configured to try-decode the adjacent 6×6 regions as well. If any of those regions is decodeable, all possible sets for this region are determined, leaving us with a set of possible identifiable security elements. By using the spatial relation of the two observed security elements to each other and matching it with the relation of the sets of identifiers with the pre-determined model, one can find the matching combination (e.g. a pair of adjacent sets) and again have identified the two adjacent security elements as well as the boundaries of the security elements—since they are arranged in a tiled manner. Naturally, if the encoding allows, unused bits may be set to a specific bit-pattern, which can be used to design Heuristics and speed up the process of finding decodable regions, i.e. security-element positions and boundaries.

The present disclosure is in no way limited to comparatively small image-sizes, i.e. 6×6 pixels. The above-mentioned strategies for identification may not be necessary for larger images, since error-corrective codes are specific enough to prevent false-reads in the first place from a certain size, i.e. Nr of bits, onwards. In the case of larger codes with more capacity, one might not need additional strategies via using a priori knowledge from the pre-defined model to avoid wrong decodes. In such a setting with larger codes, it may be possible to encode the sheet-like product in a way, so that each identifier occurs exactly once or does not occur twice in a certain local neighbourhood—given that pairs of adjacent codes are used to identify a position within the basis material. So due to the high specificity/practically error-less decoding offered by codes with reasonably large capacity/size and the fact that each identifier can be contained in max. one set of possible images, one successful decode is sufficient to determine the borders of security elements as well as identifying a particular security element (and therefore knowing the exact absolute position within the sheet-like product.)

One major objective, why programmable devices comprising a camera are used with optical variable devices is to provide an automated way to verify their presence and hence authenticity.

Without any additional equipment besides the camera, this is typically achieved by computer vision means and a computer program configured to evaluate multiple images, i.e. a video stream, captured from different angles and/or illumination conditions. Alternatively, multiple simultaneously captured images from multiple cameras may be processed. The state of the art here is to evaluate colour changes (zero-/first-order diffraction devices) or certain animation effects of images or shapes, switching contrasts etc. Due to the uncontrolled environment, the trade-offs between security and robustness/readability are substantial, i.e. only a moderate specificity—hence security—can be achieved. Typically, a second line of evaluation with forensic equipment or dedicated reading equipment evaluating the physical structure of the OVD instead of the reflection characteristics, is employed in the authentication process, if high security is a concern.

At the same time, applications employing standard equipment such as programmable devices comprising a camera often target to enable untrained users to verify the authenticity of a security device, where the user expects a convenient (hence robust) authentication process. Consequently, the OVDs or even the presence of OVDs can at best be evaluated roughly. In the context of colour-changing OVD this means for example, that accepting "any" colour change is often the way to go to confirm at least the presence of an OVD. Confirming OVD-presence is often necessary to distinguish between the 3-dimensional OVD forming a security device and a picture/photo copy thereof. More often than not, unfavourable changes in lighting or capturing artefacts induce more variation in terms of colour change, blurriness etc to the captured image of a printed replica of an OVD ("photo copy") than an original OVD would exhibit under unfavourable capturing conditions of a different kind, e.g. diffuse lighting. Therefore, decision thresholds on binary OVD presence detection (yes/no) often get close to a point, where a printed replica is accepted as an OVD under certain conditions, while the real OVDs are rejected due to lacking significant variance (e.g. only small colour changes) in the captured images.

It is also a subject of the present disclosure, to provide a way of very reliably way of confirming the presence of an optically variable device. By capturing at least two images from different angles/illumination settings and decoding at least two images for the same security element—which naturally need to be present in the set of possible images for that particular security element—in combination with the error correction it is almost certain that a OVD is present, since a photo-copy or printed replica cannot exhibit this image-switching behaviour. Further, the code-switching is error-corrected via the encoding of the markers—meaning if a change in images is observed, the chance for error is neglectable.

Figure 3A:
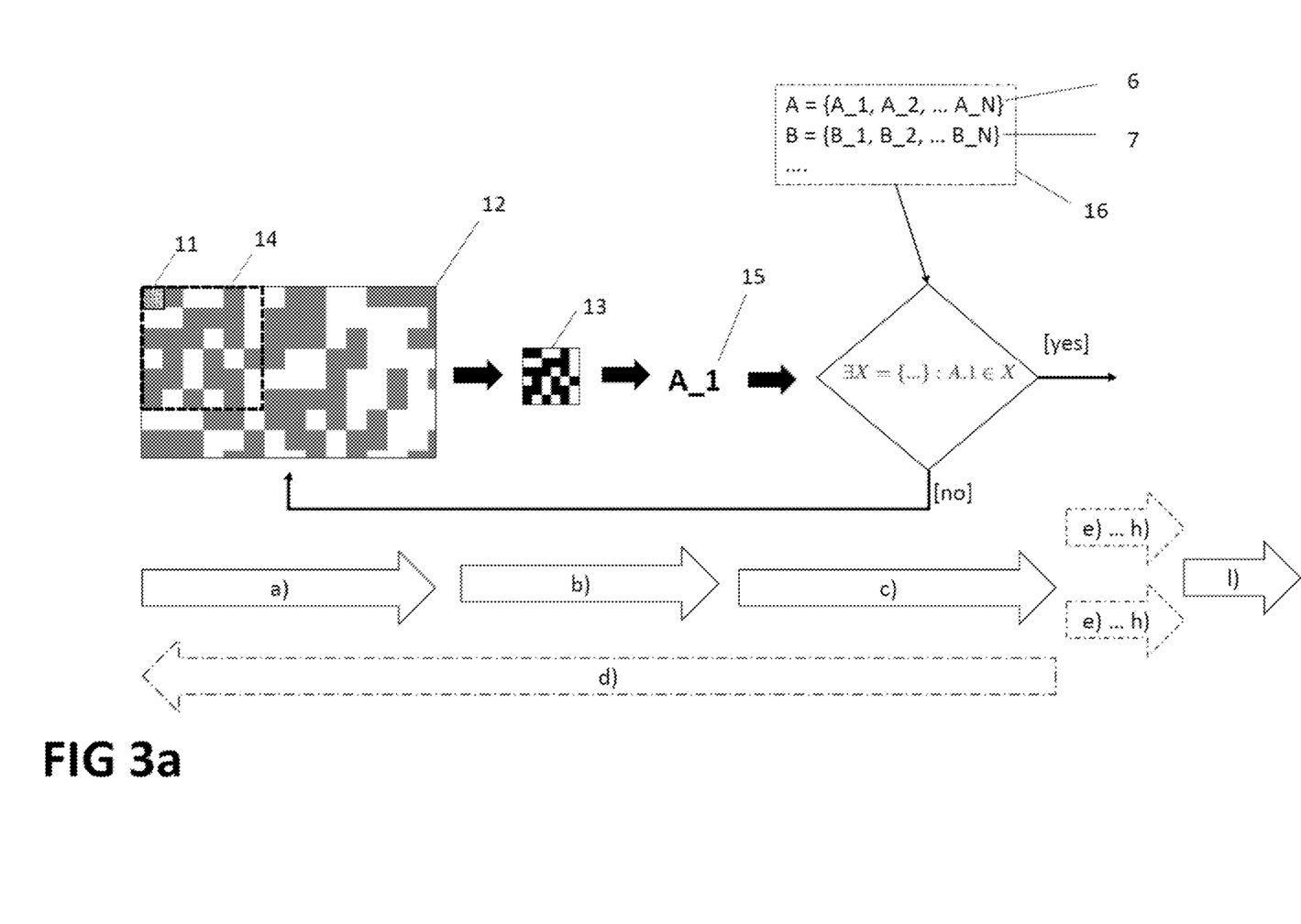
FIGS. 3a-c schematically illustrate a method for authenticating an object marking according to the present disclosure.
Figure 3B:
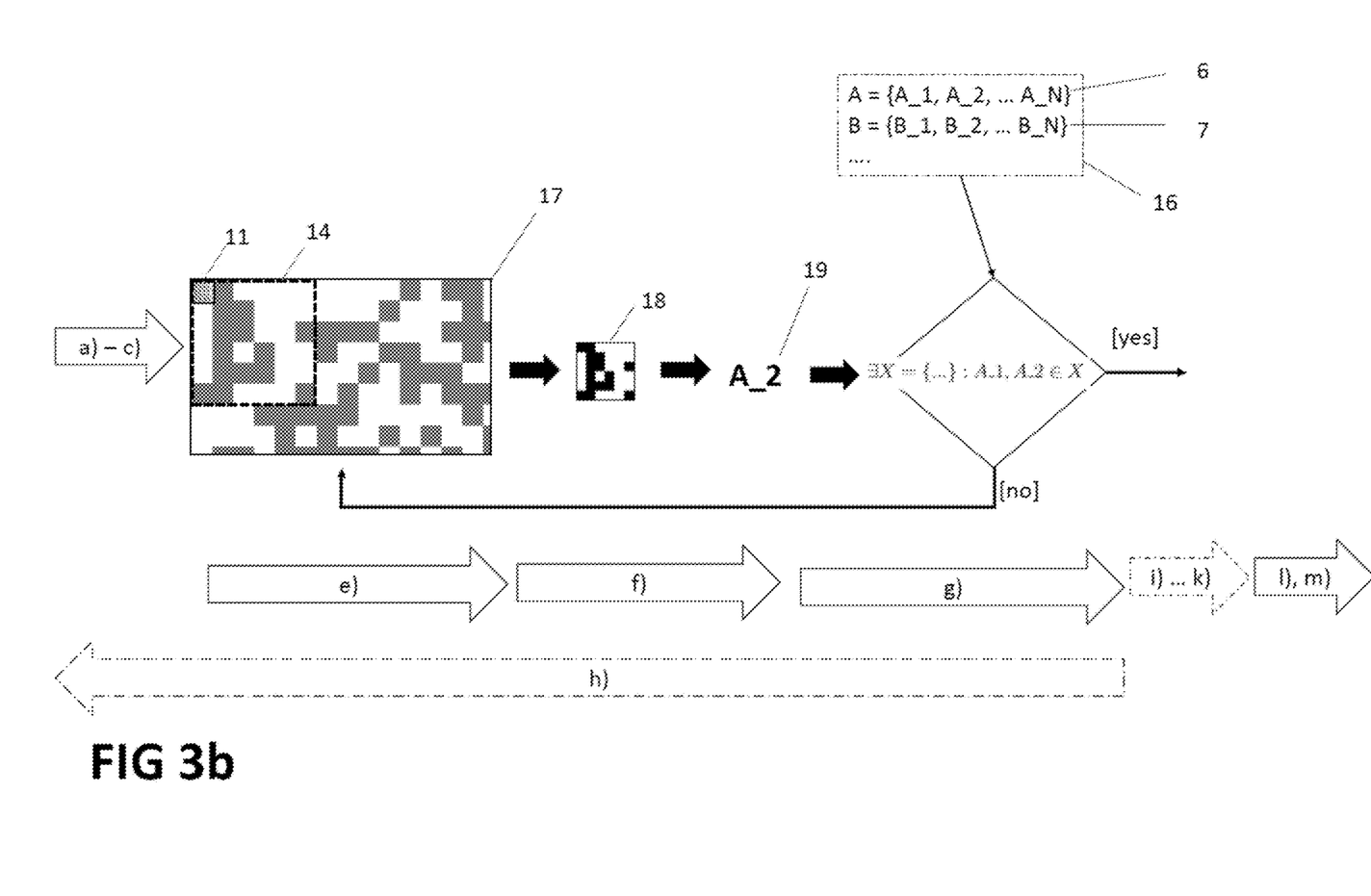
Figure 3C:
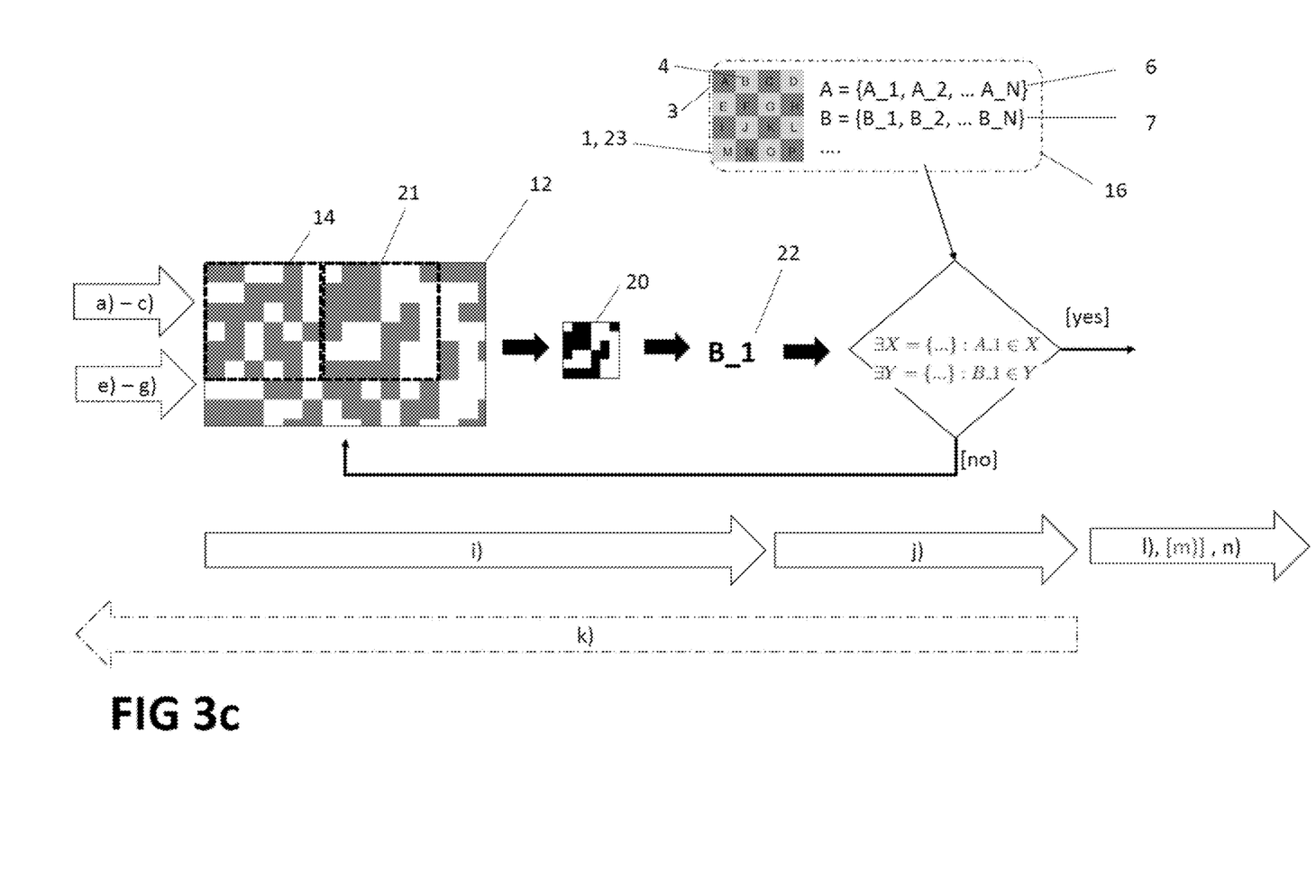

FIG. 3a-c concern a method for authenticating an object marking made from a basis material 1 according to FIG. 2. In this example, the object marking comprises a section of the basis material 1, wherein the section is partially covered by a masking layer. The security elements 2 of the basis material 1 are arranged in a tiled manner. Each code segment exhibited by the security elements is an array of (quadratic, unicolor) tiles. The code segments exhibited by one security element are arranged contagious to the code segments exhibited by other security elements, such that overall a larger array of (quadratic, unicolor) tiles is formed. The masking layer spares an optoelectronically discernibly delimited area of a basis material 1. This area comprises a first security element 3 and a second security element 4.

The method for authenticating this object marking comprises capturing a first image 12 of the object marking from a first angle or under a first direction of illumination. The first image 12 shown in FIG. 3a depicts the visual appearance of the optoelectronically discernibly delimited area under first capturing conditions (e.g. a first viewing angle). The method comprises identifying a first sample code segment 13 exhibited by a presumed first security element in the first image 12 (wherein "sample" denotes that this is a candidate for the first code segment). For the purpose of identifying the actual first code segment, the first sample code segment 13 is decoded to obtain a first sample data segment 15. More in detail, a first sample tile 11 is identified in the first image 12 in step a). Then the first sample code segment 13 in the first image 12 formed by a first sample array of tiles 14 including said first sample tile 11 on a pre-defined position is decoded in step b) to obtain a first sample data segment 15. Based on this first sample data segment 15, it is determined in step c) from a model 16 storing the sets of data segments associated with the security elements of the basis material 1, whether there is at least one set of data segments 6 containing said first sample data segment 15 (i.e. the data segment candidate). If no such set can be determined in step c), the data segment candidate is rejected and steps a) to c) are repeated with different first sample tiles until such a set is found in step c). For example, the next tile to the right of the first sample tile 11 may be identified the new "first sample tile" and the above steps are repeated. This can be repeated until a number of steps corresponding to the predetermined (known) width of the security elements in terms of tiles (here the width is six tiles) is covered and then the tile immediately below the initial first sample tile 11 may be identified the new "first sample tile" and the above steps repeated and so on. As soon as at least one set of data segments 6 can be found that contains the first sample data segment 15 (i.e. the data segment candidate), e.g. in FIG. 3a set A contains A_1, the current first sample code segment 13 is—preliminarily—identified as the first code segment.

In no particular sequence or order, the method also comprises capturing a second image 17 of the object marking under different capturing conditions (e.g. from a second angle and/or under a second direction of illumination). This is illustrated in FIG. 3b. A second code segment exhibited by the first security element is identified in the second image 17. For the purpose of identifying the second code segment, a second sample code segment 18 is decoded to obtain a second sample data segment 19. This may function similarly as for the first data segment. I.e. in step e) a first sample tile 11 is identified in the second image 17 (generally arbitrarily, e.g. the tile closest to the top left corner of the second image 17); in step f) a second sample code segment 18 in the second image 17 formed by the first sample array of tiles 14 is decoded to obtain a second sample data segment 19; in step g) it is determined from the model 16 whether at least one of the sets of the model 16 containing the first sample data segment 15 contains also the second sample data segment 19; if no such set can be determined in step g), step h) indicates a loop and that steps a) to g) are repeated until such a set 6 is found in step g). Effectively that means that the first sample code segment is rejected if no matching second sample code segment can be identified, such that both sample code segments are dismissed, scanning different tile positions and borders until a valid combination of sample code segments is found. When, on the other hand, a set having both sample data segments is found, the current second sample code segment 18 is identified as the second code segment in step m). I.e. the method determines from the model 16 storing the sets of data segments associated with the security elements of the basis material 1 whether there is a set of data segments containing the first sample data segment 15 and the second sample data segment 19. Only in the affirmative, i.e. if such a set 6 of data segments is part of the model 16, can the object marking be determined as authentic.

In addition, as illustrated in FIG. 3c, the method comprises identifying a third sample code segment exhibited by a presumed second security element in the first image 12 (but may similarly use the second image 17 or both). The identified third code segment is decoded the to obtain a third sample data segment. Based on the decoded third sample data segment, it is determined from the model, whether there is a second security element positioned relative to a first security element (as identified by the first and second sample data segments) that is associated with a set of data segments containing the third sample data segment. Hence, the model 16 not only stores the sets of data segments associated with the security elements of the basis material, but also the relative positions of the security elements of the basis material to one another. Thus, before confirming the authenticity of the object marking, the method comprises: decoding a third sample code segment 20 formed by a second sample array of tiles 21 positioned relative to the first sample array of tiles 14 in step i), to obtain a third sample data segment 22, determining in step j) from a model 16 comprising the sets 6, 7 of data segments associated with the security elements 2 of the basis material 1 and the relative positions of the security elements 2 of the basis material 1 to one another 23, whether the third sample data segment 22 is comprised in the set 7 of data segments, which belongs to the security element 4 respectively positioned relative to the security element 3 the set preliminary identified by means of searching a set with the first and second sample data segment belongs to; if no such set can be determined, going back in step k) and repeating steps a) to j), until such a set is found; and once the set is found, identifying the current sample code segments 13, 18, 20 as valid code segments in step n). Hence, the model 16 comprises the information, which sets of data segments are associated with contiguous security devices on the basis material 1.

To summarize, the method described above essentially scans (at least) two images 12, 17 of arrays of tiles starting at an arbitrary tile and selecting a different tile on each turn until the data segments represented by the code segments offset from the given tile and their respective arrangement yields a match in the model 16. If no such match is found, the object marking is rejected (i.e. the authenticity cannot be confirmed).

The invention claimed is:

1. An object marking comprising a first security element and at least a second security element, wherein each security element is associated with a set of data segments and each security element exhibits depending on the capturing conditions a code segment which is an optoelectronically readable representation of one of the data segments of the set associated with the respective security element,
wherein different distinct data segments are represented by different code segments and wherein the set associated with the first security element and the set associated with the second security element differ in at least one data segment,
wherein every code segment represents the respective data segment in a pre-defined encoding, wherein the pre-defined encoding allows for a maximum number of possible distinct data segments and wherein the number of data segments in the set of data segments of each security element is less than $1/100$ of the maximum number of possible distinct data segments.

2. The object marking according to claim 1, wherein for a fixed direction of illumination, each data segment in a set associated with a security element is associated with a distinct viewing angle region, within which the contrast of the code segment representing the respective data segment is higher than the contrast of the code segments representing all other data segments from the same set.

3. The object marking according to claim 2, wherein there is at least one viewing angle region associated with a data segment of the set of the first security element, which differs from each of the viewing angle regions associated with the data segments of the set of the second security element.

4. A set of object markings comprising a number of object markings according to claim 1.

5. The object marking according to claim 1, wherein the capturing conditions comprise the viewing angle and/or the direction of illumination.

6. Basis material for producing object markings, comprising a first security element and at least a second security element, wherein each security element is associated with a set of data segments and each security element exhibits depending on the capturing conditions a code segment which is an optoelectronically readable representation of one of the data segments of the set associated with the respective security element,
wherein different distinct data segments are represented by different code segments and wherein the set associated with the first security element and the set associated with the second security element differ in at least one data segment,
wherein every code segment represents the respective data segment in a pre-defined encoding,
wherein the pre-defined encoding allows for a maximum number of possible distinct data segments and wherein the number of distinct data segments in the sets of data segments of all security elements is less than $1/100$ of the maximum number of possible distinct data segments.

7. The basis material according to claim 6, wherein the positions of the security elements on the basis material are predetermined relative to one another according to a model and the data segments of the sets associated with the security elements are predetermined according to the model.

8. The basis material according to claim 6, wherein the capturing conditions comprise the viewing angle and/or the direction of illumination.

9. The basis material according to claim 6, wherein the pre-defined encoding comprises information for error detection or error correction.

10. A method for authenticating an object marking comprising an optoelectronically discernibly delimited area of a basis material,
wherein the basis material comprises a first security element and at least a second security element, wherein each security element is associated with a set of data segments and each security element exhibits depending on the capturing conditions a code segment which is an optoelectronically readable representation of one of the data segments of the set associated with the respective security element, wherein different distinct data segments are represented by different code segments and the set associated with the first security element and the set associated with the second security element differ in at least one data segment,
wherein the optoelectronically discernibly delimited area comprises the first security element and at least the second security element, the method comprising the steps:
capturing a first image of the object marking from a first angle or under a first direction of illumination;
identifying a first code segment exhibited by the first security element in the first image;
decoding the first code segment to obtain a first data segment;
capturing a second image of the object marking from a second angle and/or under a second direction of illumination;
identifying a second code segment exhibited by the first security element in the second image;
decoding the second code segment to obtain a second data segment;
determining from a model storing the sets of data segments associated with the security elements of the basis material whether there is a set of data segments containing the first data segment and the second data segment, identifying a third code segment exhibited by the second security element in the first image or in the second image;

decoding the third code segment to obtain a third data segment;

determining from a model storing the sets of data segments associated with the security elements of the basis material and storing the relative positions of the security elements of the basis material to one another whether the second security element positioned relative to the first security element is associated with a set of data segments containing the third data segment.

11. The method according to claim 10, wherein the first security element and at least the second security element are non-overlapping.

12. A method for authenticating an object marking comprising an optoelectronically discernibly delimited area of a basis material, wherein the basis material comprises a first security element and at least a second security element, wherein each security element is associated with a set of data segments and each security element exhibits depending on the capturing conditions a code segment which is an optoelectronically readable representation of one of the data segments of the set associated with the respective security element, wherein different distinct data segments are represented by different code segments and the set associated with the first security element and the set associated with the second security element differ in at least one data segment, wherein the optoelectronically discernibly delimited area comprises the first security element and at least the second security element, the method comprising the steps:

capturing a first image of the object marking from a first angle or under a first direction of illumination;

identifying a first code segment exhibited by the first security element in the first image;

decoding the first code segment to obtain a first data segment;

capturing a second image of the object marking from a second angle and/or under a second direction of illumination;

identifying a second code segment exhibited by the first security element in the second image;

decoding the second code segment to obtain a second data segment;

determining from a model storing the sets of data segments associated with the security elements of the basis material whether there is a set of data segments containing the first data segment and the second data segment, wherein the security elements of the basis material, of which the object marking comprises a section, are arranged in a tiled manner and each code segment exhibited by the security elements is an array of tiles and the code segments exhibited by one security element are arranged contiguous to the code segments exhibited by other security elements such that a larger array of tiles is formed, wherein the method further comprises the steps:

a) identifying a first sample tile in the first image;

b) decoding a first sample code segment in the first image formed by a first sample array of tiles including said first sample tile on a pre-defined position, to obtain a first sample data segment;

c) determining from the model storing the sets of data segments associated with the security elements of the basis material whether there is at least one set of data segments containing said first sample data segment;

d) if no such set can be determined in step c), repeating steps a) to c) with different first sample tiles until such a set is found in step c); and l) Identifying the current first sample code segment as the first code segment.

13. The method according to claim 12, wherein the method further comprises the following steps prior to step 1):

e) identifying the first sample tile in the second image;

f) decoding a second sample code segment in the second image formed by the first sample array of tiles, to obtain a second sample data segment;

g) determining from the model storing the sets of data segments associated with the security elements of the basis material, whether at least one of the at least one sets containing the first sample data segment contains the second sample data segment;

h) if no such set can be determined in step g), repeating steps a) to g) until such a set is found in step g); and m) identifying the current second sample code segment as the second code segment.

14. The method according to claim 12, wherein the method further comprises the following steps prior to step 1):

i) decoding a third sample code segment formed by a second sample array of tiles positioned relative to the first sample array of tiles, to obtain a third sample data segment;

j) determining from a model storing the sets of data segments associated with the security elements of the basis material and storing the relative positions of the security elements of the basis material to one another, whether the third sample data segment is comprised in the set of data segments which belongs to the security element respectively positioned relative to the security element the set preliminary identified under step e) belongs to;

k) if no such set can be determined in step j), repeating steps a) to d) and steps i) to j), until such a set is found in step j);

n) identifying the current third sample code segment as the third code segment.

* * * * *